UNITED STATES PATENT OFFICE.

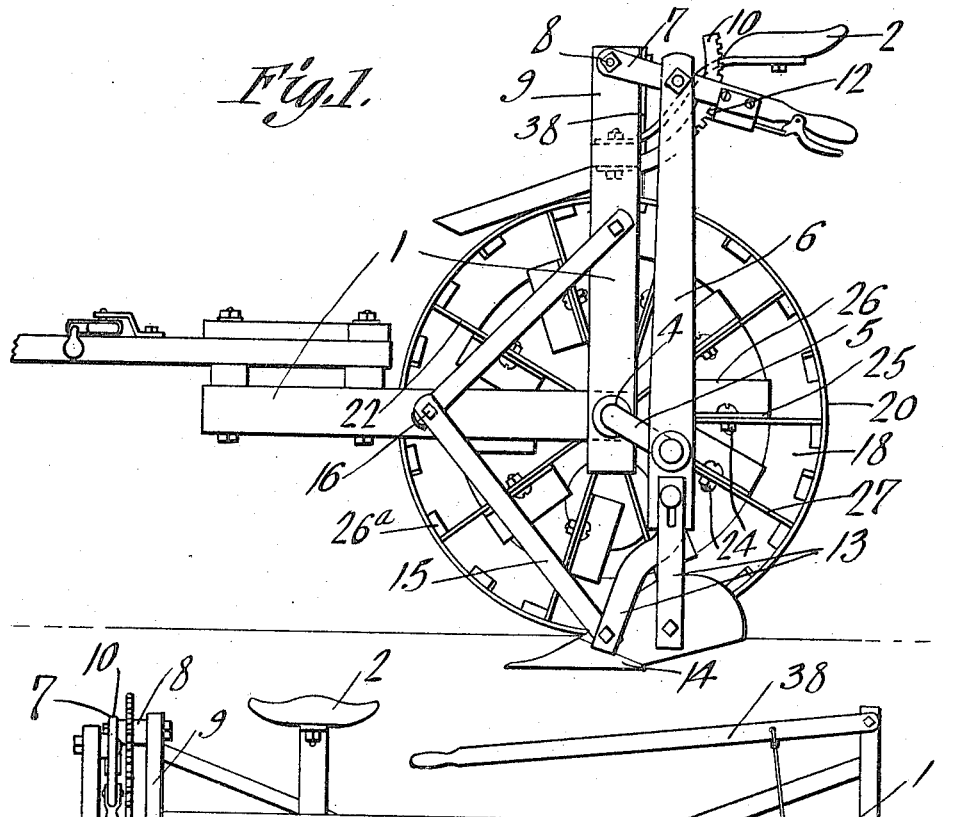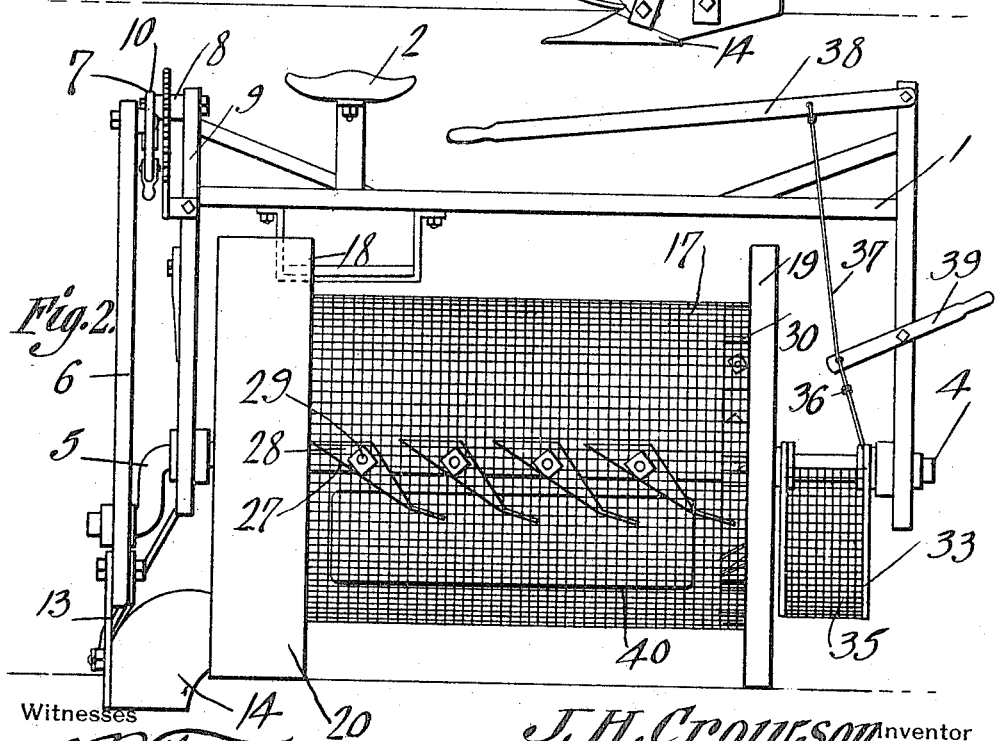

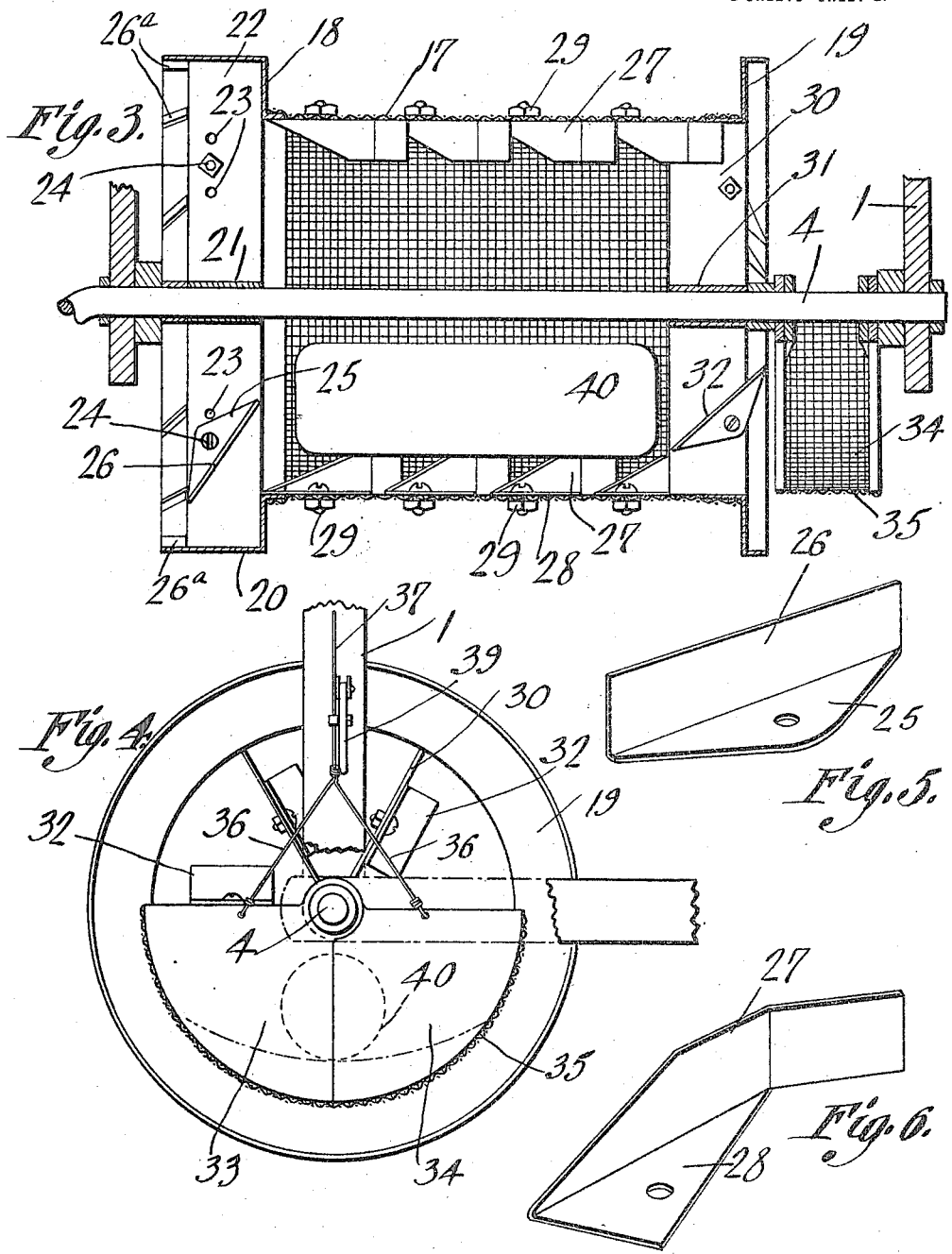

JONAS H. CROWSON, OF TEXARKANA, TEXAS.

SEPARATOR.

1,221,974.   Specification of Letters Patent.   Patented Apr. 10, 1917.

Application filed June 28, 1916. Serial No. 106,510.

*To all whom it may concern:*

Be it known that I, JONAS H. CROWSON, a citizen of the United States, residing at Texarkana, in the county of Bowie and State of Texas, have invented a new and useful Separator, of which the following is a specification.

This invention relates to separators, one of its objects being to provide means for use in connection with a plow, whereby the furrow slice will be broken up or pulverized and the dirt separated from stones, grass and other undesirable materials.

A further object is to provide means whereby the waste material separated from the soil will be directed onto the ground at a point remote from the furrow where it can be gathered up or destroyed as desired, the pulverized soil dropping to the ground close to the furrow.

A still further object is to provide simple means for directing the furrow slice into the separator and for crushing the material contained in the separator.

Another object is to provide a separator particularly designed for use in removing Johnson grass and other objectionable growths from the soil so that the same can be easily destroyed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of a plow having the present improvements combined therewith.

Fig. 2 is a rear elevation.

Fig. 3 is an enlarged central longitudinal section through the separator.

Fig. 4 is an elevation of the outer end of the separator.

Fig. 5 is a perspective view of one of the deflectors used in connection with the separator.

Fig. 6 is a perspective view of another form of deflector used in connection with the separator.

Referring to the figures by characters of reference 1 designates a frame on which may be mounted a seat 2 designed to be occupied by a driver, this frame being provided with a draft beam 3 extending forwardly therefrom.

Journaled within the sides of the frame 1 is an axle 4 one end of which is provided with a crank arm 5. This crank arm is extended through a hanger 6 the upper end of which is pivotally connected to a lever 7 fulcrumed as at 8 upon a post 9 at one side of the frame. A toothed segment 10 is employed adjacent the lever and a dog 12 is carried by the lever and is designed to engage the segment for the purpose of holding hanger 6 at any elevation desired. Secured to the lower end of the hanger 6 are standards 13 of any suitable construction connected to a plow 14, and a bar 15 is pivotally connected to one of these hangers and also to one side of the frame 1 at a point in front of the axle 4, and as indicated at 16. Thus it will be seen that when lever 7 is adjusted upwardly it will pull through the hanger 6 upon the standards 13 and cause the plow 14 to swing upwardly and rearwardly out of the soil. However, when lever 7 is thrust downwardly, the plow will be moved downwardly and forwardly into the soil.

Mounted for rotation within the frame 1 and upon the axle 4 is a cylindrical screen 17 of strong and coarse mesh, the ends of the screen being secured to outstanding rings 18 and 19 respectively and which rings are adapted to rest on the ground and to roll therealong. The ring 18 has its tread portion 20 connected to a bearing sleeve 21 by radial blades 22 each of which has a longitudinal series of openings 23. Any one of these openings is designed to receive a bolt 24 which serves to secure to the blade a flange 25 extending from one edge of a deflecting wing 26.

Extending longitudinally within the cylindrical drum 17 are longitudinal series of deflecting wings 27 each of which is provided with a flange 28 attached to the screen 17 by a bolt 29 or the like. These wings are designed to direct material longitudinally within the screen from ring 18 to ring 19. Ring 19 has a series of radial blades 30 connecting said ring to a bearing sleeve 31 mounted on axle 4 and connected to each of the blades 30 is a deflecting wing 32 similar to the wings 26 hereinbefore described and which are adapted to direct material from the screen and into a collecting basket provided therefor.

Hung from one end of axle 4 is a collecting basket made up of oppositely disposed segmental sections 33 and 34 normally held together by gravity and the bottoms of which are preferably formed of wire fabric as indicated at 35 thus to provide screens. Extending from each of the sections 33 and 34 at points remote from the axle 4 are connections 36 attached to a bar 37 which extends upwardly along the outer side of the frame 1 and is attached to a lever 38 within reach of the seat 2. Another lever 39 may be attached to the outer side of the frame 1 and also to the rod 37 so that said rod can be actuated by a person walking alongside of the machine.

In using the apparatus herein described, the plow is drawn forward as ordinarily, but the furrow slice instead of falling directly to the ground will be directed into the ring 18 and between the radial blades 22. As the screen will rotate during this forward movement, the blades 25 will engage the dirt directed into the ring 18 and deflect it inwardly into the cylindrical screen 17. In order that the clods of dirt may be broken up, a heavy roller 40 is arranged to travel freely within the cylinder, and this roller will break up the clods and cause the finely divided soil to fall through the screen and onto the ground. Any grass, large stones or other trash will be directed longitudinally of the screen by the wings 27 and will ultimately be discharged from the screen by wings 32 so as to fall into the basket provided therefor. After the basket has been filled the same can be opened by pulling upwardly on lever 39 or downwardly on lever 38, thus to deposit the accumulated material onto the ground. Said material can then be hauled away or can be burned. In order that the roller 40 may travel readily within the screen, the front or advancing ends of the wings are inclined as shown so that said wings can work readily under the roller during the forward movement of the screen.

An attachment such as herein described has been found especially advantageous for the purpose of separating Johnson grass and other objectionable growths from the soil during the plowing operation, although obviously the apparatus can be used for various other purposes such as sifting soil containing considerable gravel, etc.

The various wings can be adjusted angularly so as to regulate the feeding of the material from one end to the other of the screen.

It is preferred to make the blades 22 narrower than the tread portion of ring 18 so that the moldboard of the plow can thus project a short distance into the ring and insure the guidance of practically all of the loosened soil into the ring. Small obliquely disposed deflecting rings 26ª can be arranged on the inner surface of the tread 20 between the blades 22 and the outer edge of the tread so as to direct into position between the blades any material which may fall on the tread out of line with the blades. These supplemental wings 26ª can be located wherever desired.

What is claimed is:—

1. The combination with a cylindrical screen mounted to roll upon the ground, said screen including end rings for direct engagement with the ground, of a plow at one end of and adapted to direct a furrow slice into the screen, adjustable means within said screen for directing material from one end to the other of said screen, and crushing means loosely mounted within the screen.

2. The combination with a plow, of a cylindrical screen, end rings outstanding from the screen and adapted to roll along the ground and to support the screen out of contact with the ground, one of said rings being arranged to receive a furrow slice from the plow, means within said ring for directing the furrow slice into the screen, and means within the screen and the other ring for directing the material longitudinally of the screen and out of that end thereof remote from the plow.

3. The combination with a plow, of a cylindrical screen, end rings outstanding therefrom and adapted to roll upon the ground at one side of the plow, radial blades within each ring, means connected to one of the blades for directing material from the plow and through one of the rings and into the screen, and means within the screen for directing the material from one end to the other of the screen.

4. The combination with a plow, of a separator including an endless screen, rings connected to and supporting the ends of the screen and adapted to roll upon the ground, one of said rings constituting means for receiving loose soil from the plow, means within said ring for directing the loosened soil into the screen, and means within the screen for directing the loosened soil longitudinally of the screen.

5. The combination with a plow, of a separator including a tubular screen, supporting rings at the ends thereof for engaging and rolling along the ground, one of said rings being adapted to receive loosened soil directly from the plow, means within said ring for directing the loosened soil into the screen, means within the screen for directing portions of the loosened material longitudinally of the screen, and a revoluble crushing element loosely mounted within the screen.

6. The combination with a plow, of a separator including a tubular screen, supporting rings at the ends thereof for engaging and rolling along the ground, one of said rings being adapted to receive loosened soil directly from the plow, means within said ring for directing the loosened soil into the screen, means within the screen for directing portions of the loosened material longitudinally of the screen, means supported at one end of the screen for receiving material therefrom, and means for discharging material from said receiving means.

7. The combination with a plow, of a separator including a tubular screen, supporting rings at the ends thereof for engaging and rolling along the ground, one of said rings being adapted to receive loosened soil directly from the plow, means within said ring for directing the loosened soil into the screen, means within the screen for directing portions of the loosened material longitudinally of the screen, a basket for receiving material from one end of the screen, said basket comprising opposed segmental sections normally contacting, and means for shifting the sections relative to each other to discharge the contents of the basket.

8. The combination with a frame, and a plow connected to one side of the frame, of a tubular screen, end rings supporting the same and revoluble upon the ground, an axle extending through the rings and engaging the frame, bearing members on the axle and connected to the rings, one of said rings constituting means for receiving loosened material directly from the plow, means within the rings and screen for directing the loosened material from one end to the other of the screen, and means at one end of the screen for receiving material from the screen, said means including a basket, and means for dumping the basket.

9. The combination with a frame, an axle, a crank arm at one end of the axle, a plow supported by the crank arm, and means for shifting the plow to move it into or out of the soil, of a tubular screen, end rings movable therewith and adapted to travel along the ground, bearings upon the axle, connections between the bearings and the rings, said rings constituting means for supporting the frame, one of said rings being adapted to receive loosened material directly from the plow, and means within the rings and screen for directing loosened material from one end to the other of the screen.

10. The combination with a frame, an axle, a crank arm at one end of the axle, a plow supported by the crank arm, and means for shifting the plow to move it into or out of the soil, of a tubular screen, end rings movable therewith and adapted to travel along the ground, bearings on the axle, connections between the bearings and the rings, said rings constituting means for supporting the frame, one of said rings being adapted to receive loosened material directly from the plow, means within the rings and screen for directing loosened material from one end to the other of the screen, and means at one end of the screen for receiving material therefrom.

11. The combination with a cylindrical screen mounted to roll upon the ground, said screen including end rings for engagement with the ground, of a plow at one end of and adapted to direct a furrow slice into the screen, and crushing means loosely mounted within the screen.

In testimony that I claim the foregoing as my own, I have hereto affixed my signature in the presence of two witnesses.

JONAS H. CROWSON.

Witnesses:
 IVY E. SIMPSON,
 AGNES ROCKELLI.

Copies of this patent may be obtained for five cents each, by addressing the "Commissioner of Patents, Washington, D. C."